United States Patent [19]
Griffiths

[11] Patent Number: 4,788,021
[45] Date of Patent: Nov. 29, 1988

[54] METHOD FOR FABRICATING A SAWTOOTH CLAMP CUSHION

[76] Inventor: John E. Griffiths, 13 Peaceful Dr., Morrisville, Pa. 19067

[21] Appl. No.: 105,656

[22] Filed: Oct. 6, 1987

[51] Int. Cl.⁴ .................... B29C 47/00; B29C 59/04
[52] U.S. Cl. ........................ 264/177.17; 264/209.5; 264/210.2; 264/284; 264/289.3; 425/325; 425/385
[58] Field of Search .............. 264/209.3, 209.5, 210.2, 264/284, 288.8, 289.3, 296, 177.1, 177.17; 425/325, 385

[56] References Cited

U.S. PATENT DOCUMENTS

| | | | |
|---|---|---|---|
| 2,958,909 | 11/1960 | Bradley et al. | 264/177.17 X |
| 3,067,455 | 12/1962 | Reid | 264/149 X |
| 3,886,250 | 5/1975 | Danko | 264/210.2 X |
| 3,913,625 | 10/1975 | Gazda et al. | 138/140 |
| 3,916,488 | 11/1975 | Gazda et al. | 24/16 R |
| 4,261,940 | 4/1981 | Bussey, Jr. | 264/210.2 X |

*Primary Examiner*—Jeffery Thurlow
*Assistant Examiner*—Leo B. Tentoni
*Attorney, Agent, or Firm*—Hopgood, Calimafde, Kalil, Blaustein & Judlowe

[57] ABSTRACT

A method of fabricating a clamp cushion for use with a clamp device for mounting and restraining wires. Uncured resilient material is extruded through an extrusion die to form an extrusion having a raised upper surface on one side and, on the other side, a passageway being defined by longitudinal side walls and cover flaps to accommodate the clamp device. A toothed surface is then pressed into the raised surface of the extrusion to form a plurality of longitudinally spaced transverse nodes.

10 Claims, 2 Drawing Sheets

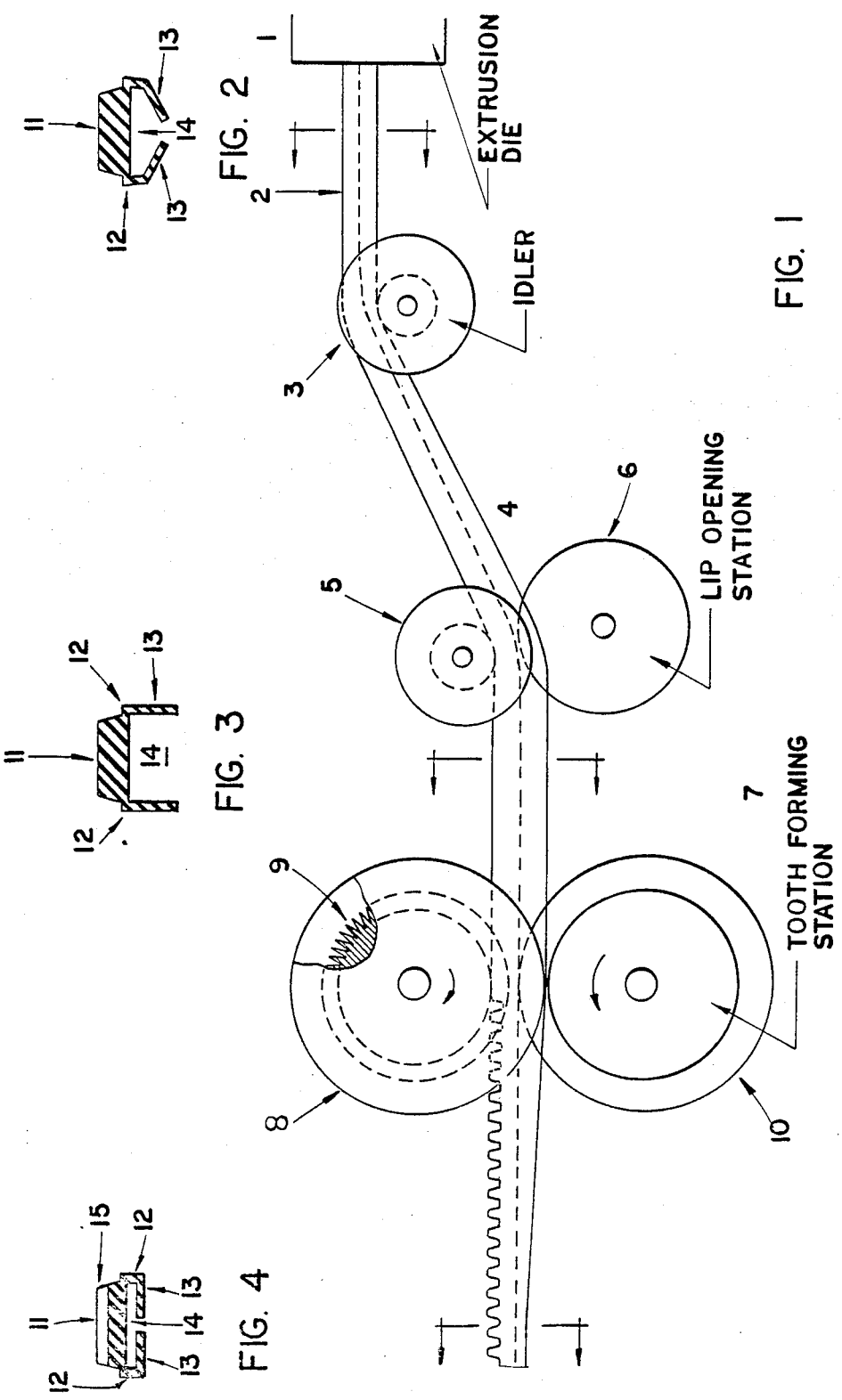

METHOD FOR FABRICATING A SAWTOOTH CLAMP CUSHION

The present invention relates generally to a method of fabricating a clamp cushion for use with a clamp device such as for mounting and restraining wires, wire conduits and the like, and particularly, to a method of fabricating a clamp cushion having a "sawtooth" configuration.

BACKGROUND OF THE INVENTION

Loop clamps for mounting and restraining a plurality of wires or pipes commonly have a cushion or lining extending around the loop. In general, the clamp cushion is a soft, rubber-like resilient material having either a smooth surface or raised nodes on one side of the lining surface. These raised nodes can take various uniform or irregular shapes including needle-like or sawtooth-like protuberances having a generally sinusoidal configuration.

In practice, the smooth, resilient lining provides point contact on the surfaces of the outer wires or pipes of a bundle. Thus, the bundle and its wires or pipes are not firmly secured and can rotate or work loose to cause possible damage or difficulty. Therefore, clamp cushions having a nodal or serrated configuration are preferred since they tend to grip the outer strands of wire between the nodal or serrated protuberances and thereby help to position and secure the individual wires more efficiently than would a flat surface cushion.

One type of widely used clamp cushion having a serrated configuration is the "sawtooth" clamp cushion. In addition to its improved ability to restrain and maintain a bundle of wires within a clamp device, the "sawtooth" clamp cushion has excellent vibration and noise damping characteristics when it is used on rigid tubing applications. The major drawback to the "sawtooth" cushion form is, however, its relatively high cost.

Clamp cushions are conventionally fabricated either by molding or by extruding the soft resilient material into a desired shape. For example, in the compression molding process, uncured rubber is placed into a mold. The mold is closed, thereby forcing the rubber into the final shape, and heat is then applied to cure the rubber. Alternatively, injection and transfer molding processes can be used. In the extrusion process, uncured rubber is forced through an opening that is shaped to the desired configuration and heat is then applied to the extruded rubber to cure it. The molding process is a batch-type process and is thus relatively slow and labor intensive. The extrusion process is continuous and faster than the molding process and fabrication of cushions by extrusion requires much less labor per part such that parts manufactured by the extrusion process are considerably less expensive than identical parts manufactured by the molding process. However, the fabrication of the serrated or "sawtooth" configuration of clamp cushions does not lend itself to the conventional extrusion process since the sawtooth-like protuberances are each at a 90° angle to the direction of flow of the resilient material through the extrusion die. Prior to the present invention, therefore, "sawtooth" clamp cushions were generally fabricated as molded strips with the associated production drawbacks of using molds.

It is accordingly an object of this invention to provide a method of extruding soft resilient material to prepare a clamp cushion having a plurality of longitudinally spaced transverse nodes on the surface of the cushion at a lower cost and greater efficiency than in the conventional molding procedure.

It is another object of this invention to provide such a method wherein a clamp cushion having a serrated or "sawtooth" configuration is fabricated by a continuous and effective extrusion process.

Still another object of this invention is to provide such a method wherein the extrusion of clamp cushions having uniform or non-uniform sized serrations on the surface is cost-and labor-efficient.

SUMMARY OF THE INVENTION

The present invention is directed to a method of fabricating a clamp cushion for use with a clamp device for mounting and restraining wires, wire conduits and similar structures. In accordance with the broad aspects of the present invention, an uncured resilient material is extruded through an extrusion die. The shape of the extrusion die forms an extrusion having a raised upper surface on one side and a passageway defined by longitudinal side walls and cover flaps to accommodate the clamp device on its opposite surface. Before the extrusion is cured, a toothed surface is pressed into the raised upper surface of the extrusion to form a plurality of longitudinally spaced transverse nodes. Preferably, the transverse nodes so formed are uniform sized serrations, although non-uniform serrations can be produced for those applications where they have an advantage.

BRIEF DESCRIPTION OF THE DRAWINGS

To the accomplishment of the aforementioned and to such further objects as may hereinafter appear, the present invention relates to a method of fabricating a clamp cushion for use with a clamp device substantially as defined in the appended claims and as described in the followed specification as considered with the accompanying drawings in which:

FIG. 1 is schematic of the inventive extrusion process;

FIG. 2 is a cross-sectional view of an extrusion in the shape of a clamp cushion after the extrusion has been extruded through the extrusion die;

FIG. 3 is a cross-sectional view of the clamp cushion at the tooth forming station of the process illustrated in FIG. 1;

FIG. 4 is a cross-sectional view of a clamp cushion fabricated in accordance with the method of the present invention;

DETAILED DESCRIPTION OF THE INVENTION

Figure 5:
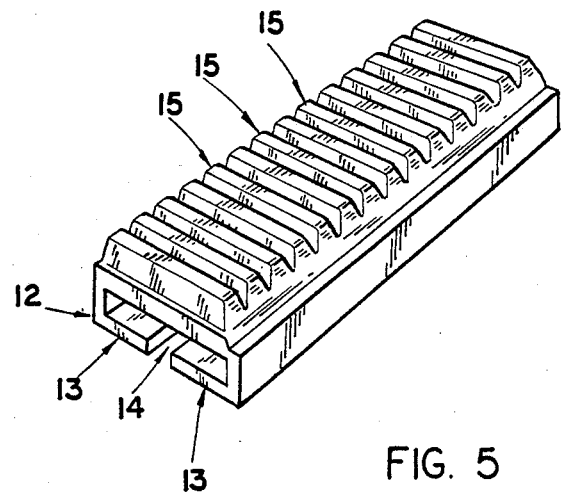
FIG. 5 is a perspective view of an embodiment of a clamp cushion fabricated in accordance with the method of the present invention.
Figure 6:
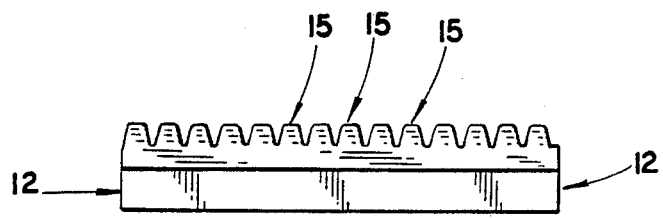
FIG. 6 is a lateral view of a clamp cushion fabricated in accordance with the method of the present invention.

The method of the invention is intended to fabricate a clamp cushion such as that illustrated in FIGS. 4-6 which is commonly used to mount and secure a plurality of wires in a clamp loop. The clamp cushion has a raised upper surface (11) on which longitudinally spaced uniform sized serrations (15) are formed. On the side opposite raised upper surface (11), there is a passageway (14) for accommodating a clamp device. Passageway (14) is defined by longitudinal side walls (12) and cover flaps (13) which form right angles with side walls (12). The clamp cushion is installed in a loop clamp so that the surface serrations (15) are radially directed inwardly to provide separation and a greatly increased contact or gripping area for the wires or pipes mounted and retained in the clamp loop.

To fabricate a clamp cushion of this type in accordance with the method of the present invention as illustrated in FIG. 1, an uncured resilient material, preferably made of soft, thermal setting rubber such as silicone, nitrile and ethylene propylene, is extruded through an extrusion die (1) in a conventional manner. The shape of extrusion die (1) is such that, when the resilient material has been extruded, there is formed an extrusion (2) having a raised upper surface (11) on one side and a passageway (14) is defined on its opposite or lower surface by longitudinal side walls (12) and cover flaps (13) to accommodate a clamp device. Raised surface (11) must have a sufficient thickness to enable displacement of that surface into nodes or other forms of surface protuberances (15) in the completed clamp cushion. FIG. 2 is a cross-sectional view of extrusion (2) after the resilient material has been extruded through extrusion die (1).

After the material has passed through extrusion die (1), extrusion (2) is fed over an idler (3) comprising a first rotating roller for conveying extrusion (2) into a cover flap or lip opening station (4). Station (4) comprises a second roller (5) and a third roller (6) which cooperate with each other to spread cover flaps (13) apart so that the cover flaps are spaced apart and depend downwardly from the lower surface as shown in FIG. 3, after extrusion (2) exits station (4). Upper roller (5) guides extrusion (2) through lip opening station (4). Lower roller (6) actually opens cover flaps (13) into a downward direction.

Extrusion (2) is then caused to move from station (4) to a tooth forming station (7) which comprises a fourth roller (8) having a gear-like or toothed surface (9) which cooperates with a fifth roller (10) to form a plurality of longitudinally spaced transverse nodes (15) on raised upper surface (11) of extrusion (2). Specifically, nodes (15) are formed at station (7) by pressing toothed surface (9) of roller (8) into the raised surface (11) of extrusion (2). Lower roller (10) of tooth forming station (7) functions as a support while the teeth (9) of roller (8) are engaged in raised upper surface (11) of extrusuion (2). Surface nodes (15) thus formed can have any shape and form and can be uniformly or irregularly sized depending on the configuration of tooth surface (9) of roller (8). However, it is a preferred embodiment of the present invention to form the transverse nodes as uniform sized serrations. Preferably, tooth forming station (7) will be located as near as possible to extrusion die (1) so that upper surface (11) of extrusion (2) is still soft enough to be displaced into surface protuberances (15) by teeth (9) of roller (8).

Extrusion (2) is then stretched slightly after leaving tooth forming station (7) to cause nodes (15) to separate and cover flaps (13) to fold back to their desired position as shown in FIG. 4. Curing of the extrusion can then take place.

It will be appreciated that the method of fabricating a clamp cushion of the present invention as described hereinabove meets the objects set forth in that a clamp cushion with surface protuberances can be be fabricated economically and efficiently by an extrusion process. In this way, the use of molds is avoided and the concomitant production drawbacks are avoided. It will also be appreciated that modifications can be made in the embodiment of the invention hereinabove described without departing from the spirit and scope of the invention.

What is claimed is:

1. A method of fabricating a clamp cushion for use with a clamp device comprising the steps of:
   (a) extruding an uncured resilient material through an extrusion die to form an extrusion having a raised upper surface on one side and a lower surface, side walls and cover flaps at a right angle to the side walls to define a passageway for accommodating the clamp device, thereafter
   (b) spreading the cover flaps so that the cover flaps are spaced apart;
   (c) pressing a toothed surface into the raised upper surface of the extrusion while the cover flaps are spread open to form a plurality of longitudinally spaced transverse nodes; and
   (d) curing the extrusion so formed.

2. The method of claim 1, further comprising the step of feeding the extrusion over an idler after the material has left the extrusion die.

3. The method of claim 1, further comprising the step of stretching the extrusion after the transverse nodes have been formed on the raised surface of the extrusion.

4. The method of claim 1, in which the transverse nodes so formed are uniform sized serrations.

5. The method of claim 1, in which the transverse nodes so formed are non-uniform sized serrations.

6. A method of fabricating a clamp cushion for use with a clamp device comprising the steps of:
   (a) extruding an uncured resilient material through an extrusion die to form an extrusion having a raised upper surface on one side and a lower surface, side walls and cover flaps at a right-angle to the side walls to define a passageway for accommodating the clamp device, thereafter
   (b) passing the extrusion between a first pair of rollers which cooperate with each other to spread the cover flaps apart in a downwardly direction from the lower surface,
   (c) pressing a toothed surface into the raised upper surface while the extrusion passes between a second pair of rollers to form a plurality of longitudinally spaced transverse nodes; and
   (d) curing the extrusion so formed.

7. The method of claim 6, further comprising the step of feeding the extrusion over an idler after the material has left the extrusion die.

8. The method of claim 6, further comprising the step of stretching the extrusion after the transverse nodes have been formed on the raised surface of the extrusion.

9. The method of claim 6, in which the transverse nodes so formed are uniform sized serrations.

10. The method of claim 6, in which the transverse nodes so formed are non-uniform sized serrations.

* * * * *

UNITED STATES PATENT AND TRADEMARK OFFICE
CERTIFICATE OF CORRECTION

PATENT NO. : 4,788,021
DATED : November 29, 1988
INVENTOR(S) : Griffiths It is certified that error appears in the above-identified patent and that said Letters Patent is hereby corrected as shown below:

On the title page Insert:

-- (73) Assignee: IMO Delaval, Inc., Adel Fasteners Division --.

Signed and Sealed this

Twentieth Day of June, 1989

Attest:

DONALD J. QUIGG

Attesting Officer

Commissioner of Patents and Trademarks